US008126082B2

(12) United States Patent
Jeng

(10) Patent No.: US 8,126,082 B2
(45) Date of Patent: Feb. 28, 2012

(54) GAIN WEIGHTED CODE COMBINING SYSTEM AND METHOD FOR COMBINING BPSK CODES

(75) Inventor: Isaac Ming-En Jeng, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 1054 days.

(21) Appl. No.: 12/013,073

(22) Filed: Jan. 11, 2008

(65) Prior Publication Data

US 2009/0046810 A1 Feb. 19, 2009

Related U.S. Application Data

(63) Continuation-in-part of application No. 11/831,378, filed on Jul. 31, 2007, now abandoned, and a continuation of application No. 11/831,405, filed on Jul. 31, 2007, now abandoned.

(51) Int. Cl.
*H04L 27/18* (2006.01)
(52) U.S. Cl. ....................................................... 375/308
(58) Field of Classification Search .................. 375/295, 375/296, 298, 376, 308
See application file for complete search history.

(56) References Cited

U.S. PATENT DOCUMENTS 7,039,122 B2 * 5/2006 Dragonetti .................... 375/295

OTHER PUBLICATIONS

Park, K. "Quadrature Multiplex Modulation System with Application to the Orbiter's Ku-band Link". National Telecommunications Conference, Dec. 1, 1975, pp. 33-22 to 33-26; XP008039410, New York, United States.*
Spilker, James J., Jr., Orr, Richard S. "Code Multiplexing via Majority Logic for GPS Modernization," ION GPS-98; Proceedings of the 11th International Technical Meeting of the Satellite Division of the Institute of Navigation, Nashville, TN, Pt. 1; United States; Sep. 15-18, 1998. pp. 265-273.

* cited by examiner

*Primary Examiner* — Kevin M Burd
(74) *Attorney, Agent, or Firm* — Harness, Dickey & Pierce, P.L.C.

(57) ABSTRACT

A method and system for generating a composite binary phase shift keying (BPSK) code from at least two independent component BPSK codes that is representative of each of the component BPSK codes. According to one embodiment the method involves gain weighting each BPSK code by its respective code power ratio to form a corresponding pluarity of gain weighted codes. The gain weighted codes are then processed in accordance with an algorithm to form a composite BPSK code. The composite BPSK code has at least a fifty percent probability of matching each one of the component BPSK codes. Specific implementations for generating a composite BPSK code from either two component BPSK codes, or from three component BPSK codes, are also disclosed.

17 Claims, 17 Drawing Sheets

| a(t) | b(t) | c(t) | x(t) |
|---|---|---|---|
| -1 | -1 | -1 | -1 |
| -1 | -1 | 1 | -1 |
| -1 | 1 | -1 | -1 |
| -1 | 1 | 1 | 1 |
| 1 | -1 | -1 | -1 |
| 1 | -1 | 1 | 1 |
| 1 | 1 | -1 | 1 |
| 1 | 1 | 1 | 1 |

Matching Result    0.75    0.75    0.75

Probability of matching chips between the composite code and component codes

| a(t) | b(t) | c(t) | x(t) |
|---|---|---|---|
| -1 | -1 | -1 | 1 |
| -1 | -1 | 1 | -1 |
| -1 | 1 | -1 | -1 |
| -1 | 1 | 1 | 1 |
| 1 | -1 | -1 | -1 |
| 1 | -1 | 1 | 1 |
| 1 | 1 | -1 | 1 |
| 1 | 1 | 1 | -1 |

0.50    0.50    0.50

Probability of matching chips between the composite code and component codes

FIGURE 4

Equation 8  $x(t) = sign\{[\sqrt{g_a}a(t) + \sqrt{g_b}b(t) + c(t) - \sqrt{g_a}a(t) * \sqrt{g_b}b(t) * c(t)]\}.$ Equation 9  $x(t) = sign[\sqrt{g_a} + \sqrt{g_b} + 1 - \sqrt{g_a g_b}] = \begin{cases} 1 \\ 0 \\ -1 \end{cases}$ depends on the gain ratios, and it can be interpreted as $$\sqrt{g_a} + \sqrt{g_b} + 1 - \sqrt{g_a g_b} \gtrless 0$$

$$\sqrt{g_a} + \sqrt{g_b} + 1 \gtrless \sqrt{g_a g_b}$$

Hence, the formula:

Equation 10  $\dfrac{\sqrt{g_a} + \sqrt{g_b} + 1}{\sqrt{g_a g_b}} \gtrless 1.$

The implication is that:

$x(t) = sign[\sqrt{g_a} + \sqrt{g_b} + 1 - \sqrt{g_a g_b}] = \begin{cases} 1 \text{ and } 75\% \text{ matching} & \text{if } \dfrac{\sqrt{g_a} + \sqrt{g_b} + 1}{\sqrt{g_a g_b}} > 1 \\ 0 \text{ and } 50\% \text{ matching} & \text{if } \dfrac{\sqrt{g_a} + \sqrt{g_b} + 1}{\sqrt{g_a g_b}} = 1 \\ -1 \text{ and } 50\% \text{ matching} & \text{if } \dfrac{\sqrt{g_a} + \sqrt{g_b} + 1}{\sqrt{g_a g_b}} < 1 \end{cases}$

| a(t) | b(t) | c(t) | x(t) |
|---|---|---|---|
| -1 | -1 | -1 | 1 |
| -1 | -1 | 1 | -1 |
| -1 | 1 | -1 | -1 |
| -1 | 1 | 1 | 1 |
| 1 | -1 | -1 | -1 |
| 1 | -1 | 1 | 1 |
| 1 | 1 | -1 | 1 |
| 1 | 1 | 1 | -1 |
| 0.50 | 0.50 | 0.50 | |

PROBABILITY OF MATCHING CHIPS BETWEEN THE
COMPOSITE CODE AND COMPONENT CODES $g_a = 9, g_b = 4, g_c = 1$

| a(t) | b(t) | c(t) | x(t) |
|------|------|------|------|
| -1 | -1 | -1 | 0 |
| -1 | -1 | 1 | -1 |
| -1 | 1 | -1 | -1 |
| -1 | 1 | 1 | 1 |
| 1 | -1 | -1 | -1 |
| 1 | -1 | 1 | 1 |
| 1 | 1 | -1 | 1 |
| 1 | 1 | 1 | 0 |
| 0.50 | 0.50 | 0.50 | |

Probability of matching chips between the composite code and component codes

FIGURE 7

| | a(t) | b(t) | x(t) |
|---|---|---|---|
| | -1 | -1 | -1 |
| | -1 | 1 | -1 |
| | 1 | -1 | -1 |
| | 1 | 1 | 1 |
| Matching Result | 0.75 | 0.75 | |

Probability of matching chips between the composite code and component codes

FIGURE 15

| $g_a = 18, g_b = 1$ | | |
|---|---|---|
| a(t) | c(t) | x(t) |
| -1 | -1 | -1 |
| -1 | 1 | -1 |
| 1 | -1 | -1 |
| 1 | 1 | -1 |
| 0.50 | 0.50 | |

Probability of matching chips between the composite code and component codes

FIGURE 16

$$g_a = (2+\sqrt{5})^2, g_b = 1$$

| a(t) | b(t) | x(t) |
|------|------|------|
| -1   | -1   | -1   |
| -1   | 1    | -1   |
| 1    | -1   | -1   |
| 1    | 1    | 0    |
| 0.50 | 0.50 |      |

Probability of matching chips between the composite code and component codes

FIGURE 18

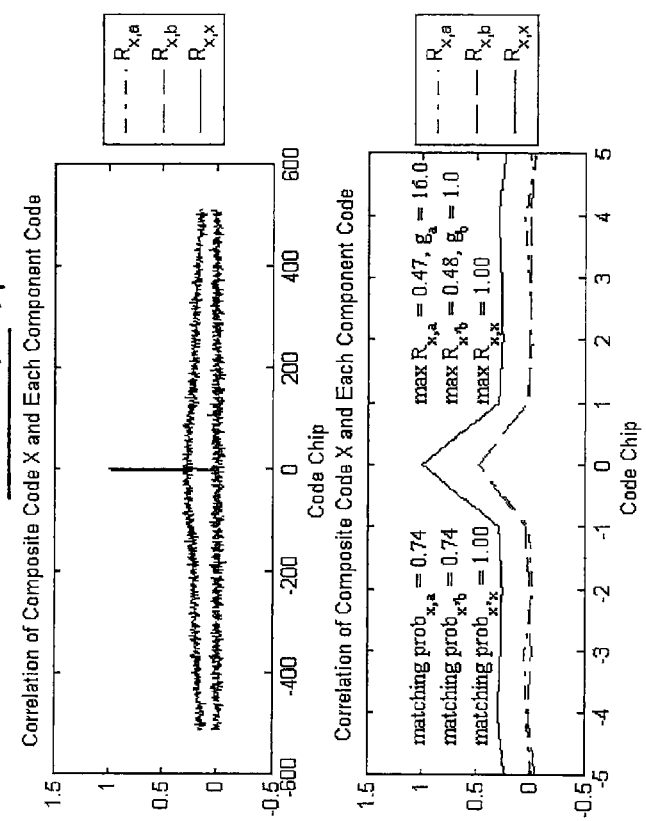
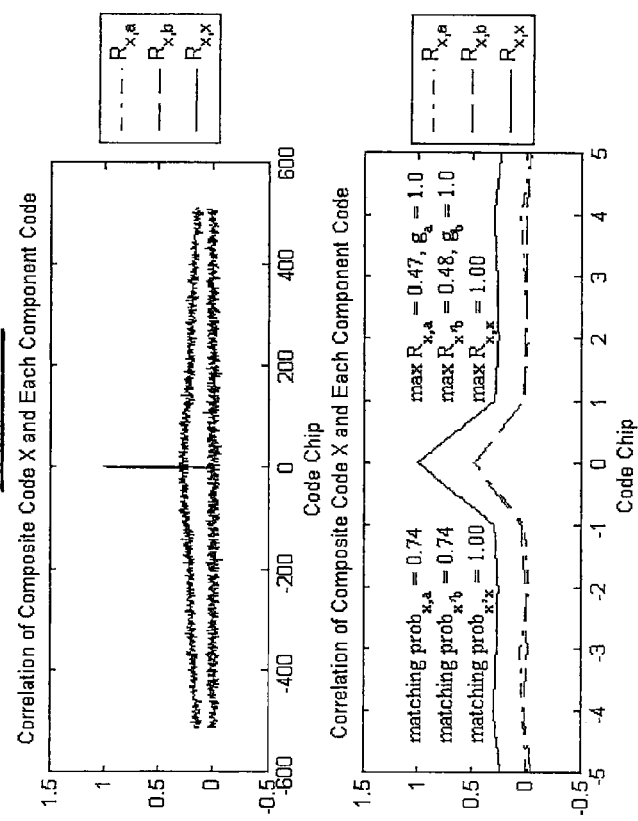

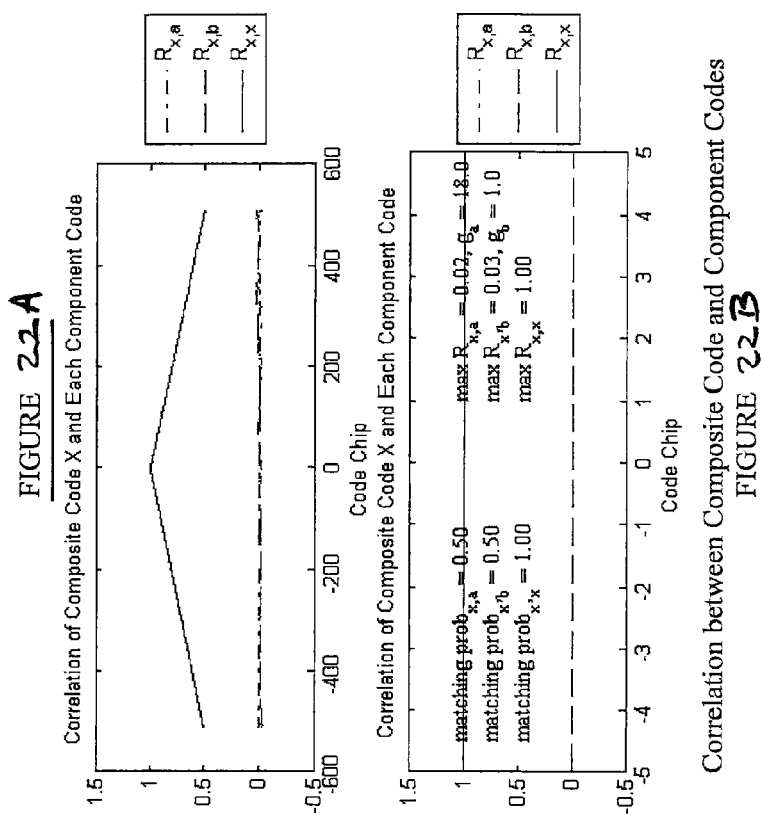
FIGURE 22A
FIGURE 22B
Correlation between Composite Code and Component Codes
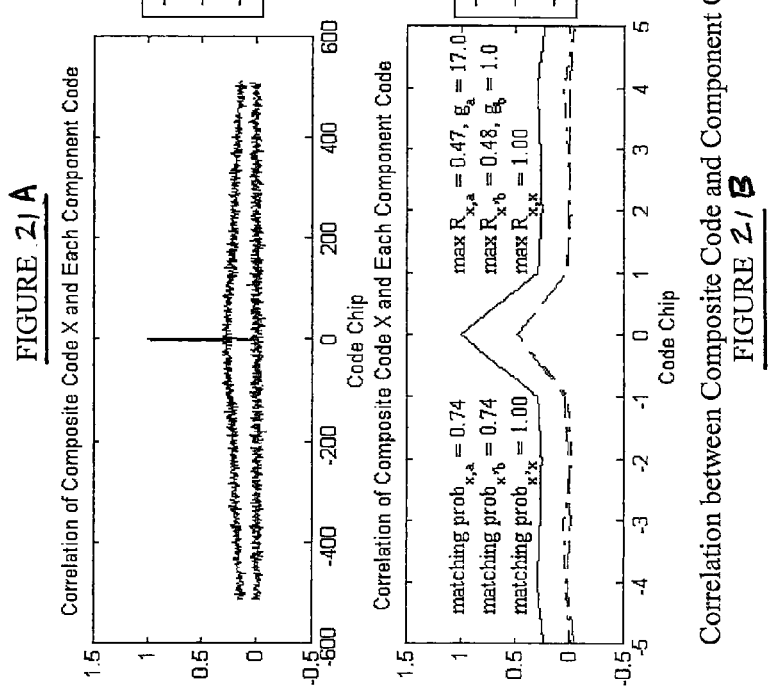
FIGURE 21A
FIGURE 21B
Correlation between Composite Code and Component Codes

GAIN WEIGHTED CODE COMBINING SYSTEM AND METHOD FOR COMBINING BPSK CODES

CROSS-REFERENCE TO RELATED APPLICATIONS

This application is a continuation in part of U.S. application Ser. No. 11/831,378, filed Jul. 31, 2007, and Ser. No. 11/831,405, also filed on Jul. 31, 2007, which are both hereby incorporated by reference into the present application.

STATEMENT OF U.S. GOVERNMENT RIGHTS

The subject matter of the present disclosure was developed at least in part pursuant to a contract with the U. S. Air Force pursuant to contract number FA8807-04-C-0002. The U.S. Government has certain rights in the subject matter of the present disclosure.

FIELD

The present disclosure relates to binary phase shift keying (BPSK) code combining systems and methods, and more particularly to a combining method and system of a plurality of BPSK codes to enable a single, composite BPSK code to be generated that is representative of plurality of separate BPSK codes.

BACKGROUND

The statements in this section merely provide background information related to the present disclosure and may not constitute prior art.

Currently, the global positioning system GPS IIF transmits three binary phase shift keying (BPSK) codes using a modulation scheme known in the industry as "Interplex" modulation. The Interplex modulation scheme modulates three BPSK codes such that the modulated signal has a constant power. The GPS III system needs to transmit two additional BPSK codes. However, the transmitted signal still needs to have a constant power.

One option for combining the five signals involves using the Interlace combining scheme. The Interlace combining scheme can be used to combine the three BPSK codes into one, so the original total of five BPSK codes are reduced to three. These three codes can then be modulated using Interplex just like what is presently being done in GPS IIF.

The above technique suffers from certain limitations and drawbacks because it requires complex logic. For one, the existing Interlace combining technique requires a uniform random number generator. Optimum performance of the Interlace combining technique depends on the authenticity (i.e., flatness) of the uniform random number generator (i.e., the degree to which the generated random numbers are uniformly distributed). In addition, when a uniform random number generator is utilized, a mapping table is required to make a selection for the current chip of the composite code between either the majority voted code (the code that is formed by the three component codes on the majority-vote basis) or one of the two BPSK component codes of higher code powers, depending on the magnitude of the random number. This process repeats when a random number is generated.

SUMMARY

The present disclosure relates to a method and system for generating a composite BPSK code from a plurality of potentially different component BPSK codes. In one implementation the method involves combining three BPSK codes into one BPSK code. In this implementation the first, second and third component BPSK codes are gain weighted by their respective code power ratios to form first, second and third gain weighted codes respectively. The first, second and third gain weighted codes are processed in accordance with an algorithm to form a composite BPSK code. The composite BPSK code has a probability of more than fifty percent of matching each one of the component BPSK codes.

In the above exemplary implementation, gain weightings (also known as code power ratios) of the first, second and third BPSK codes involve the operations of:

assigning a(t) to represent the first component BPSK code, where a(t) is a random BPSK code equally likely to be +1 or −1, and has the highest code power of the three component BPSK codes;

assigning b(t) to represent the second component BPSK code, where b(t) is a random BPSK code equally likely to be +1 or −1, and has the second highest code power of the three component BPSK codes;

assigning c(t) to represent the third component BPSK code, where c(t) is a random BPSK code equally likely to represent +1 or −1, and has a code power no more than that of the other two component BPSK codes;

determining code power ratios using the formulas:

$$g_a = \frac{\text{code power of } a(t)}{\text{code power of } c(t)}$$

$$g_b = \frac{\text{code power of } b(t)}{\text{code power of } c(t)}$$

$$g_c = \frac{\text{code power of } c(t)}{\text{code power of } c(t)} = 1$$

and where $g_a$, $g_b$ and $g_c$ are arranged such that:

$$g_a \geq g_b \geq g_c = 1$$

As used herein, the term "code power" means the power associated with a specific component BPSK code.

The composite BPSK code is represented by a term x(t), and determined in a chip-synchronous manner by the formula (where * denotes multiplication):

$$x(t) = \text{sign}\{[\sqrt{g_a}a(t) + \sqrt{g_b}b(t) + c(t) - \sqrt{g_a}a(t) * \sqrt{g_b}b(t) * c(t)]\}.$$

A system for generating a composite BPSK code from three component BPSK codes is also disclosed. Advantageously, the system does not require the use of a uniform random number generator or a mapping table.

This present methodology has its unique combining efficiency related to the correlations between the composite BPSK code and each of the component BPSK codes. This combining efficiency, being less than 100%, can be practically interpreted as a reduction of the effective code power for each of the component codes. The correlation between the composite BPSK code and a component code may lie between −1 to 1 inclusive, and shows the resemblance of one with the other. For example, when the correlation is close to 1, it means almost all the chips of the composite BPSK code and the respective chips of the component BPSK code are the same. Likewise when the correlation is close to −1, except that the two are 180-degree out of phase. When the correlation is close to zero, a very low percentage of the composite BPSK code chips and the respective component code BPSK chips are the same.

In another implementation a method and system for generating a single, composite BPSK code from a pair of potentially different component BPSK codes is disclosed. In one implementation the method involves gain weighting first and second component BPSK codes by its respective code power ratio to form first and second gain weighted codes. The first and second gain weighted codes are processed in accordance with an algorithm to form a composite BPSK code. The composite BPSK code has a probability of fifty percent or greater of matching each one of the component BPSK codes. Determining the gain weightings (i.e., code power ratios) of the first and second component BPSK codes may involve the operations of:

assigning a(t) to represent the first component BPSK code, where a(t) is a random BPSK code equally likely to be +1 or −1, and has the higher code power of the two component BPSK codes;

assigning b(t) to represent the second component BPSK code, where b(t) is a random BPSK code equally likely to be +1 or −1, and has a code power no more than the code power of the other component BPSK code;

determining code power ratios using the formulas:

$$g_a = \frac{\text{code power of } a(t)}{\text{code power of } c(t)}$$

$$g_b = \frac{\text{code power of } b(t)}{\text{code power of } b(t)} = 1$$

and where wherein $g_a$ and $g_b$ are arranged such that:

$g_a \geq g_b = 1$.

The composite BPSK code is represented by a term x(t), and determined in a chip-synchronous manner by the formula (where * denotes multiplication):

$$x(t) = \text{sign}\left\{\left[\sqrt{g_a}\, a(t) + b(t) - \frac{1}{2}g_a - \frac{1}{2} + \sqrt{g_a}\, a(t) * b(t)\right]\right\}$$

A system for generating a composite BPSK code from two component BPSK codes is also disclosed. Advantageously, the system does not require the use of a uniform random number generator or a mapping table.

A method for determining the reduction of the effective code power for each of the component BPSK codes (whether two or three component BPSK codes are being combined) is also disclosed, together with a method for compensating for these reductions.

BRIEF DESCRIPTION OF THE DRAWINGS

The drawings described herein are for illustration purposes only and are not intended to limit the scope of the present disclosure in any way.

FIG. 3 is a table illustrating the probability of matching chips between the composite BPSK code and the component BPSK codes;

FIG. 4 is a table illustrating the probability of matching chips between the composite BPSK code and component BPSK codes;

FIG. 4A illustrates certain ones of major formulas associated with the implementation of the present disclosure;

FIG. 7 is a table illustrating the probability of matching chips between the composite BPSK code and the component BPSK codes;

FIG. 15 is a table illustrating the probability of matching chips between the composite BPSK code and the two component BPSK codes;

FIG. 16 is a table illustrating the probability of matching chips between the composite BPSK code and two component BPSK codes for different code power ratios;

FIG. 18 is a table illustrating the probability of matching chips between the composite BPSK code and the two component BPSK codes for different code power ratios;

FIGS. 19A and 19B are graphs illustrating the correlations of the composite BPSK code with itself and with the two component BPSK codes.

FIGS. 20A and 20B are graphs illustrating the correlation between the composite BPSK code and the two component BPSK codes but for different code power ratios;

FIGS. 21A and 21B are graphs illustrating the correlation between the composite BPSK code and the two component BPSK codes for different code power ratios;

FIGS. 22A and 22B are additional graphs illustrating the correlation between the composite BPSK code and the two component BPSK codes, and how the correlations drop virtually to zero when the code power ratios exceed a predetermined interval.

DETAILED DESCRIPTION

The following description is merely exemplary in nature and is not intended to limit the present disclosure, application, or uses.

The present disclosure relates to methods and systems for generating a composite binary phase shift keying (BPSK) code from a plurality of independent component BPSK codes. In one specific implementation a method and system for generating a single, composite BPSK code from three potentially different component BPSK codes is disclosed. In another implementation a system and method for combining two potentially different component BPSK codes to form a single, composite BPSK code is disclosed. In either implementation, the composite BPSK code can then be transmitted as one BPSK code and is a representative of the plurality of component BPSK codes. The two above-mentioned implementations will be discussed separately in the following paragraphs, with the implementation for combining three component BPSK codes being discussed first.

First Exemplary Implementation for Combining Three Component BPSK Codes

In the first exemplary implementation for combining three component BPSK codes, the three component BPSK codes are initially defined by assigning a(t) to represent the first component BPSK code, where a(t) is a random BPSK code equally likely to be +1 or −1, and has the highest code power of the three component BPSK codes. The term b(t) is assigned to represent the second component BPSK code, where b(t) is a random BPSK code equally likely to be +1 or −1, and has the second highest code power of the three component BPSK codes. The term c(t) is assigned to represent the third component BPSK code, where c(t) is a random component BPSK code equally likely to represent +1 or −1, and has a code power no more than that of the other two component BPSK codes.

Code power ratios (also known as gain weightings) associated with each of the component BPSK codes $g_a$, $g_b$ and $g_c$ are then determined by the following formulas:

$$g_a = \frac{\text{code power of } a(t)}{\text{code power of } c(t)} \quad \text{Equation 1}$$

$$g_b = \frac{\text{code power of } b(t)}{\text{code power of } c(t)} \quad \text{Equation 2}$$

$$g_c = \frac{\text{code power of } c(t)}{\text{code power of } c(t)} = 1 \quad \text{Equation 3}$$

and the code powers are in descending order (i.e., power of a(t)≧power of b(t)≧power of c(t), and $g_c$ is set equal to 1 (i.e., $g_a \geq g_b \geq g_c = 1$).

Once the code power ratios have been determined, and in view of the fact that $g_c$ is set equal to 1, the following algorithm can be used to determine the composite BPSK code:

$$x(t) = \text{sign}\{[\sqrt{g_a}a(t) + \sqrt{g_b}b(t) + c(t) - \sqrt{g_a}a(t) * \sqrt{g_b}b(t)*c*(t)]\} \quad \text{Equation 4}$$

Figure 1:
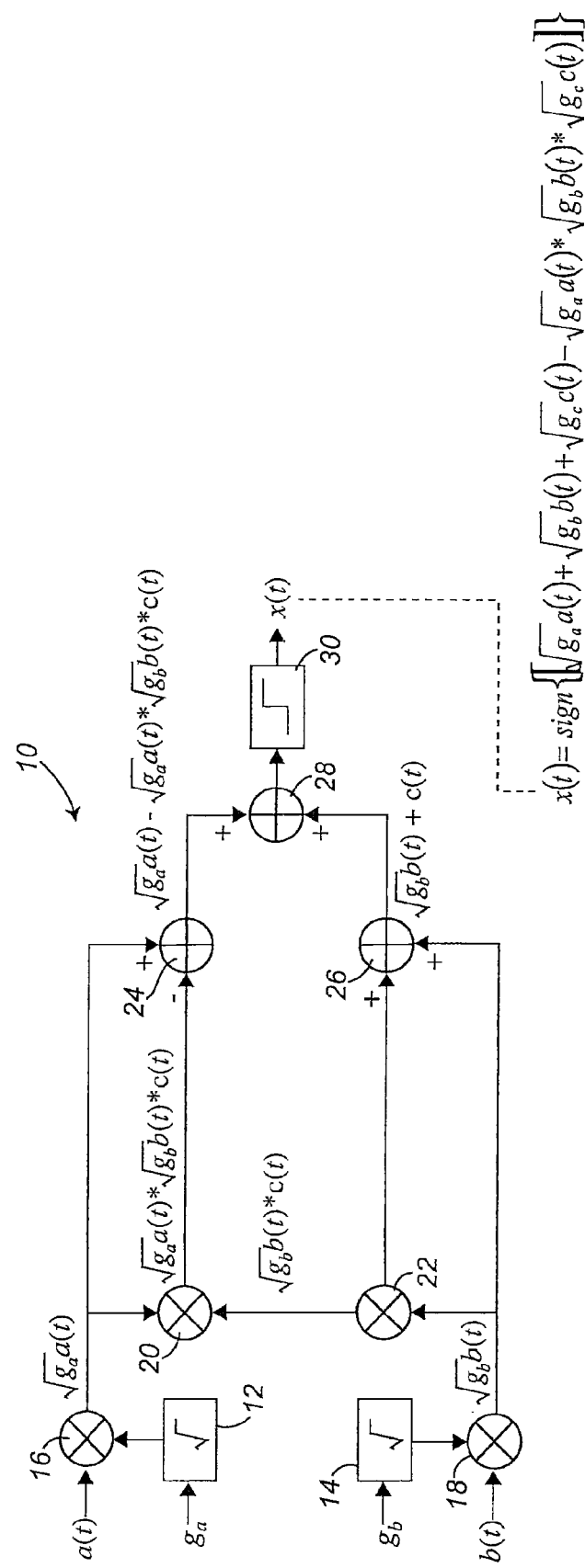
FIG. 1 is a simplified block diagram of one embodiment of a system in accordance with the present disclosure.

A system 10 in accordance with one embodiment of the present disclosure for implementing Equation 4 is illustrated in FIG. 1. The system 10 makes use of two square root determining circuits 12 and 14, four multiplier circuits 16, 18, 20 and 22, three summing circuits 24, 26 and 28, and a zero threshold comparing circuit 30. Alternatively, some or all of the functions of system 10 may be implemented by a suitable programmed computer processor. For convenience, portions of various equations that are performed by their corresponding components in system 10 are reproduced adjacent to their respective components.

Figure 2:
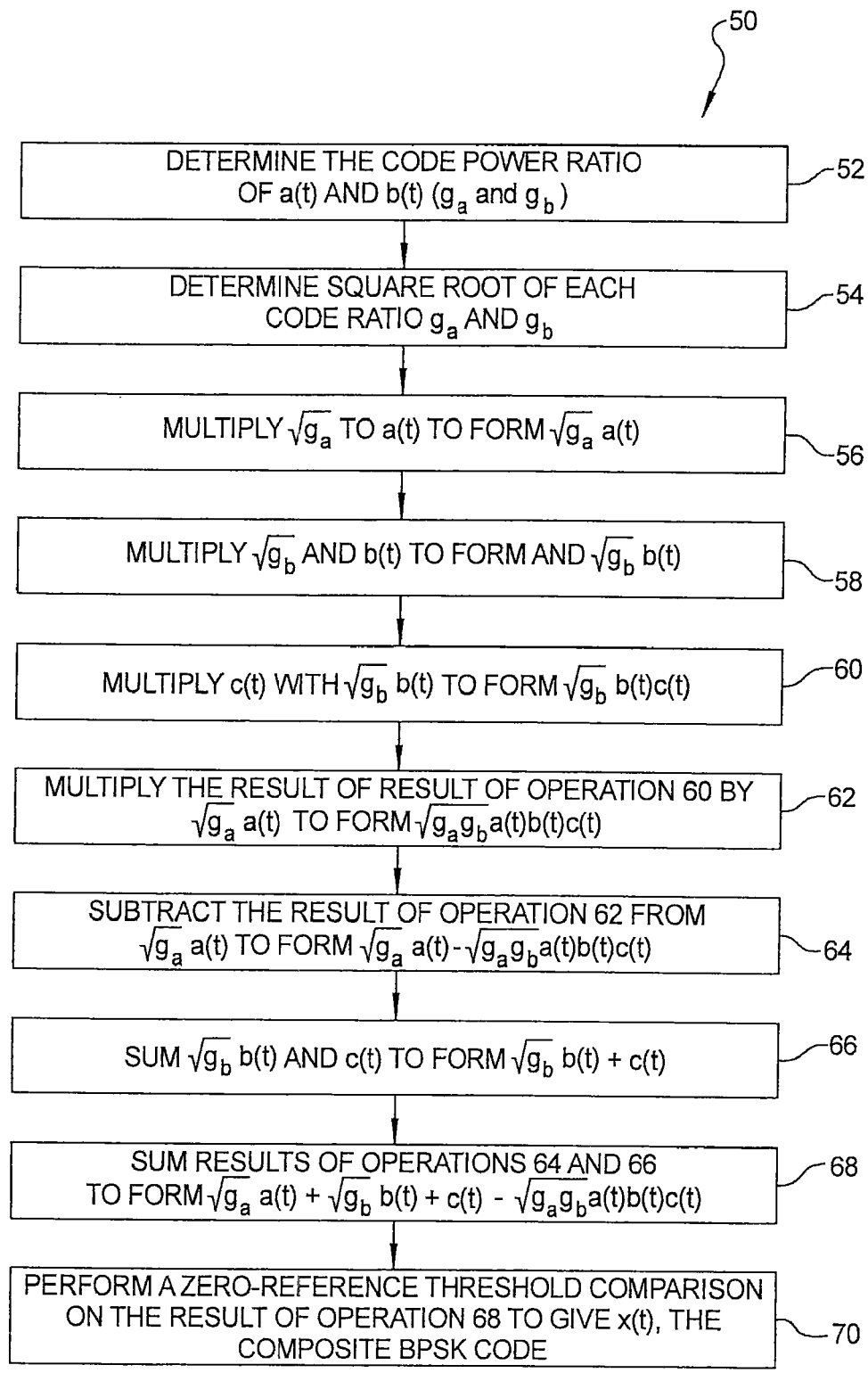
FIG. 2 is a flowchart setting forth a plurality of exemplary operations of a method of the present disclosure for determining a composite BPSK code from a plurality of three potentially different component BPSK codes.

With reference to flowchart 50 of FIG. 2 and the system 10 shown in FIG. 1, the operation of the system 10 will be described. At operation 52, determine the code power ratios $g_a$ and $g_b$ in accordance with the Equations set forth in Equations 1 and 2 above. At operation 54, the square root of each code ratio $g_a$ and $g_b$ is determined using square root determining circuits 12 and 14. At operation 56, multiply $\sqrt{g_a}$ and a(t) to form $\sqrt{g_a}a(t)$ using multiplier circuit 16. At operation 58, multiply $\sqrt{g_b}$ and b(t) to form and $\sqrt{g_b}b(t)$ using multiplier circuit 18. At operation 60, multiply c(t) with $\sqrt{g_b}b(t)$ to form $\sqrt{g_b}b(t)c(t)$ using multiplier circuit 22. At operation 62, multiply the result of operation 60 by $\sqrt{g_a}a(t)$ to form $\sqrt{g_a g_b}a(t)b(t)c(t)$ using multiplier circuit 20. At operation 64, subtract the result of operation 62 from $\sqrt{g_a}a(t)$ to form $\sqrt{g_a}a(t) - \sqrt{g_a g_b}a(t)b(t)c(t)$ using summing circuit 24. At operation 66, sum $\sqrt{g_b}b(t)$ and c(t) to form $\sqrt{g_b}b(t)+c(t)$ using summing circuit 26. At operation 68, sum the results of operation 64 and 66 to form $\sqrt{g_a}a(t) + \sqrt{g_b}b(t) + c(t) - \sqrt{g_a g_b}a(t)b(t) c(t)$ using summing circuit 28. At operation 70, perform a zero-reference threshold comparison using zero threshold comparing circuit 30 on the result of operation 68 to give x(t), the composite BPSK code.

The composite code x(t) has the matching probabilities illustrated in FIG. 3 if $g_a = g_b = g_c = 1$. From the graphs of FIG. 3, it will be appreciated that each component BPSK code matches the composite BPSK code 75% (i.e., on average each component code matches the composite code 6 out of 8 chips). By a "match", it is meant that the product of a component code chip and its corresponding composite code chip is "1"; a mismatch is "−1". When all 8 chips are matched (i.e., matching probability of 100%), the correlation between a component BPSK code and the composite BPSK code would be:

$$R_{x,a} = R_{x,b} = R_{x,c} = \frac{8(1) + 0(-1)}{8} = 1 = 0 \text{ dB}. \quad \text{Equation 5}$$

This is perfect or "full" correlation. When the matching probability drops below 100%, perfect correlation is no longer achievable. For a matching probability of 75%, the impact on the correlation is shown below:

$$R_{x,a} = R_{x,b} = R_{x,c} = \frac{6(1) + 2(-1)}{8} = 0.50 = -3 \text{ dB}. \quad \text{Equation 6}$$

Hence, 75% matching probability translates to 3 dB correlation loss. Note that each matching or mismatching chip increases or decreases the correlation, respectively.

If $g_a$ and $g_b$ vary, the matching probabilities will also vary. For code power ratios $g_a=10$, $g_b=4$, and $g_c=1$, the matching probabilities are tabulated at FIG. 4.

Figures 5, 6:
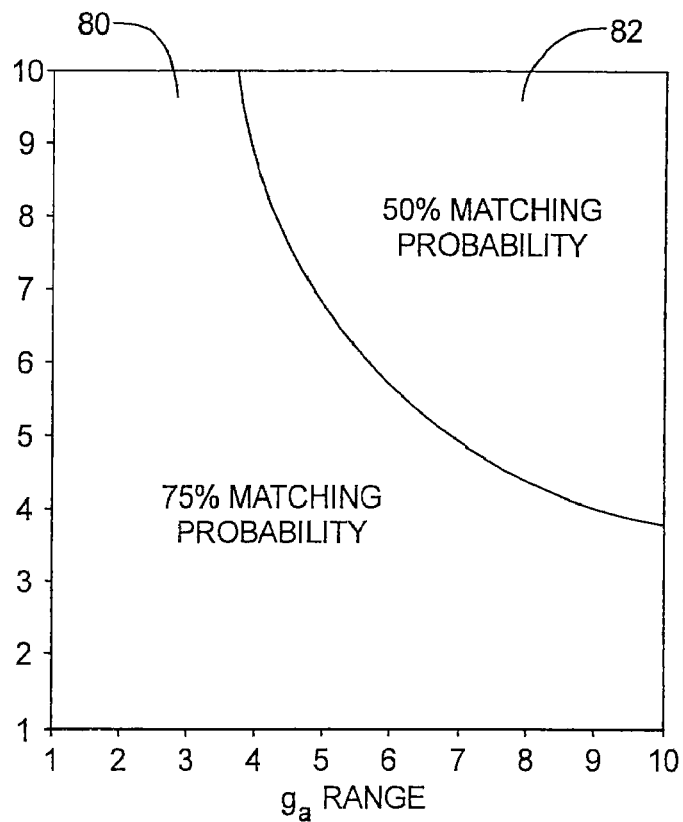
FIG. 5 is a table illustrating the probability of matching chips between the composite BPSK code and the component BPSK codes.
FIG. 6 is a graph illustrating the matching probability of each component BPSK code against the composite BPSK code over the ranges of $g_a$ and $g_b$.

Note that from the tables in FIGS. 3 and 4, x(t) changes from 1 to −1 when a(t)=b(t)=c(t)=1 (or changes from −1 to 1 when a(t)=b(t)=c(t)=−1). Referring to FIG. 5, when swapping $g_a$ and $g_b$, the same result is achieved. This is expected since $\sqrt{g_a}a(t)$ and $\sqrt{g_b}b(t)$ satisfy the communicative law. The communicative law holds that when one adds or multiplies numbers, the order doesn't matter. Fifty percent matching means on average each component code matches the composite code 4 out of 8 chips. The correlation is reduced to zero:

$$R_{x,a} = R_{x,b} = R_{x,c} = \frac{4(1)+4(-1)}{8} = 0 = -\infty \text{ dB.} \qquad \text{Equation 7}$$

Since the code power ratios among the component BPSK codes change the correlation between the composite BPSK code and each component BPSK code, it is then essential to ascertain the ranges of $g_a$ and $g_b$ and the corresponding matching probabilities for the component BPSK codes. The development is shown below from Equation 4:

$$x(t) = \text{sign}\{[\sqrt{g_a}a(t)+\sqrt{g_b}b(t)+c(t)-\sqrt{g_a}a(t)*\sqrt{g_b}b(t)*c(t)]\} \qquad \text{Equation 8}$$

Since x(t) changes from 1 to −1 when a(t)=b(t)=c(t)=1, it can be shown that $$x(t) = \text{sign}[\sqrt{g_a} + \sqrt{g_b} + 1 - \sqrt{g_a g_b}] = \begin{cases} 1 \\ 0 \\ -1 \end{cases} \qquad \text{Equation 9}$$

depends on the gain ratios, and it can be interpreted as $$\sqrt{g_a} + \sqrt{g_b} + 1 - \sqrt{g_a g_b} \gtreqless 0$$

$$\sqrt{g_a} + \sqrt{g_b} + 1 \gtreqless \sqrt{g_a g_b}$$

Hence, the formula:

$$\frac{\sqrt{g_b} + \sqrt{g_b} + 1}{\sqrt{g_a g_b}} \gtreqless 1. \qquad \text{Equation 10}$$

The implication is that:

$$x(t) = \text{sign}[\sqrt{g_a} + \sqrt{g_b} + 1 - \sqrt{g_a g_b}] = \begin{cases} 1 \text{ and } 75\% \text{ matching} & \text{if } \frac{\sqrt{g_a}+\sqrt{g_b}+1}{\sqrt{g_a g_b}} > 1 \\ 0 \text{ and } 50\% \text{ matching} & \text{if } \frac{\sqrt{g_a}+\sqrt{g_b}+1}{\sqrt{g_a g_b}} = 1 \\ -1 \text{ and } 50\% \text{ matching} & \text{if } \frac{\sqrt{g_a}+\sqrt{g_b}+1}{\sqrt{g_a g_b}} < 1 \end{cases}$$

The above formulas are also presented in FIG. 4A for convenience.

FIG. 6 illustrates the ranges and matching probabilities of each component BPSK code against the composite BPSK code x(t) where cross-hatched area 80 represents an area where 75% matching probability is achieved, and stippled area 82 represents an area where 50% matching probability is achieved. When $g_a$=9 and $g_b$=4, then:

$$x(t) = \text{sign}[\sqrt{g_a} + \sqrt{g_b} + 1 - \sqrt{g_a g_b}] = 0 \qquad \text{Equation 11}$$

if $$\frac{\sqrt{g_a} + \sqrt{g_b} + 1}{\sqrt{g_a g_b}} = 1.$$

The occurrence of Equation 11 is on the border between areas 80 and 82. Thus, the probability of occurrence is very small and is negligible. The probabilities of the component BPSK codes matching the composite BPSK code x(t) are as illustrated in the table of FIG. 7. Thus, the ranges for $g_a$ and $g_b$ and the corresponding matching probabilities can mathematically be expressed as $$\frac{\sqrt{g_a} + \sqrt{g_b} + 1}{\sqrt{g_a g_b}} = \begin{cases} >1 & 75\% \text{ matching} \\ <1 & 50\% \text{ matching} \end{cases}.$$

Figure 8A:
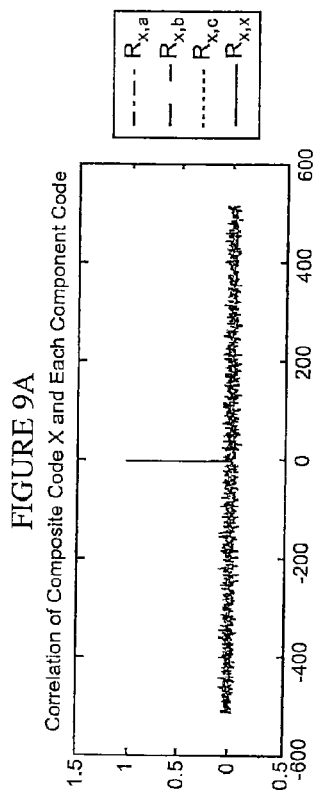
FIGS. 8A and 8B are graphs illustrating the correlations of the composite BPSK code with itself and with the component BPSK codes.
Figure 9A:
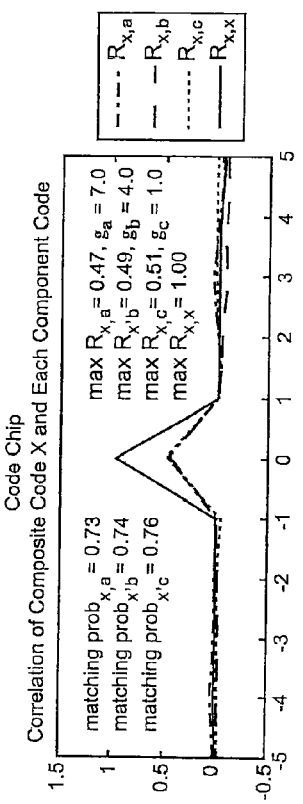
FIGS. 9A and 9B are graphs illustrating the correlations between the composite BPSK code and the component BPSK codes but for different code power ratios.
Figure 8B:
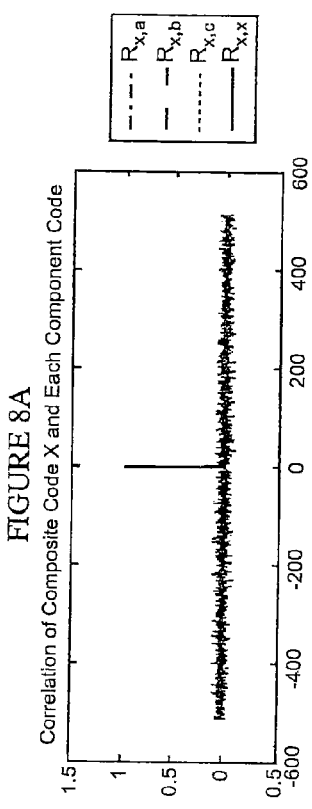

FIGS. 8A, 8B, 9A, 9B, 10A, 10B and 11A, 11B demonstrate the relationship between the matching probability and the associated correlation at various code power ratios. These Figures assume infinite bandwidth. Had a filter of a finite bandwidth been applied before correlation takes place, the correlation will be reduced due to out-of-band loss. The amount of reduction depends on the filter bandwidth and the chip rates of the component BPSK codes. FIGS. 8A and 8B are graphs illustrating the correlations of the composite BPSK code with itself and with the component BPSK codes; the correlation of the composite BPSK code with itself has a peak of unity since it matches itself perfectly as it should. The correlations of the composite BPSK code with the component BPSK codes have peaks roughly 0.5 indicating the 75% matching between the composite BPSK code and the component BPSK codes (see Equation 6 below). FIG. 8B is an enlarged version of FIG. 8A focusing on the details of the peaks of these correlations.

Figure 9B:
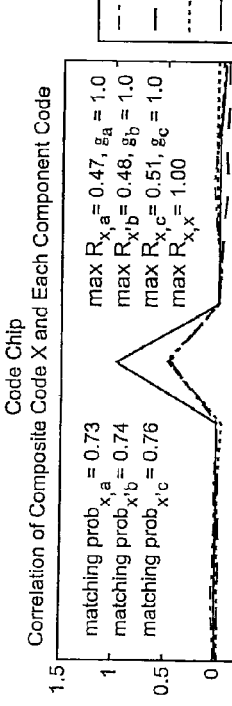
Figure 10A:
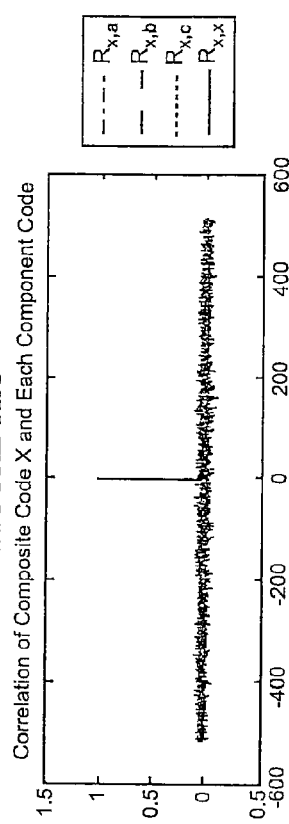
FIGS. 10A and 10B are graphs illustrating the correlations between the composite BPSK code and the component BPSK codes for different code power ratios, and highlighting the reduction in correlation between each of the component BPSK codes and the composite BPSK code when the code power ratios are close to the border between the cross-hatched and stippled areas of FIG. 6.
Figure 10B:
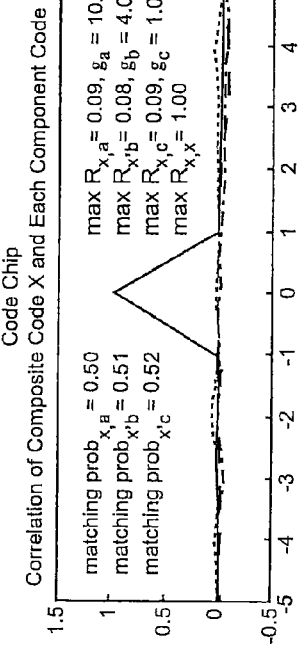
Figure 11A:
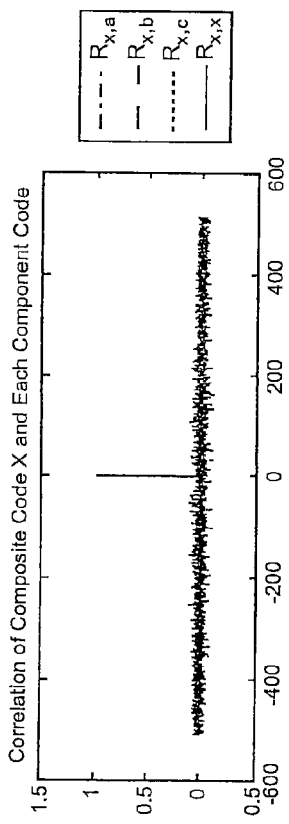
FIGS. 11A and 11B are additional graphs illustrating the correlation between the composite BPSK code and the component BPSK codes, and how the correlations drop virtually to zero when the code power ratios fall within the stippled area of the graph of FIG. 6.
Figure 11B:
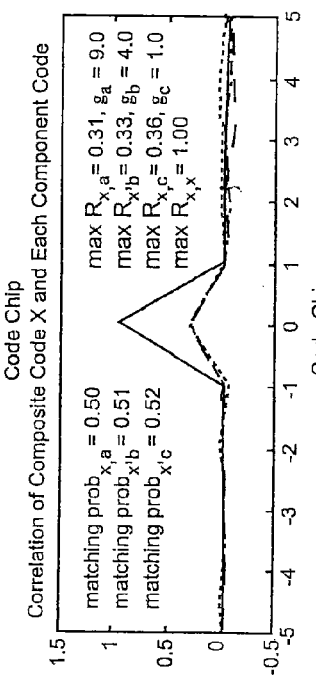

The correlations shown in FIGS. 8B and 9B have code power ratios in the cross-hatched area 80 of FIG. 6 and have a matching probability of roughly 75% as stated in Equation 6. The correlations in FIG. 11B are virtually zero since the code power ratios are well within the stippled area 82 of FIG. 6. The correlations in FIG. 10B are approaching zero since the code power ratios are on the border between cross-hatched 80 and stippled 82 areas in FIG. 6.

Figure 12:
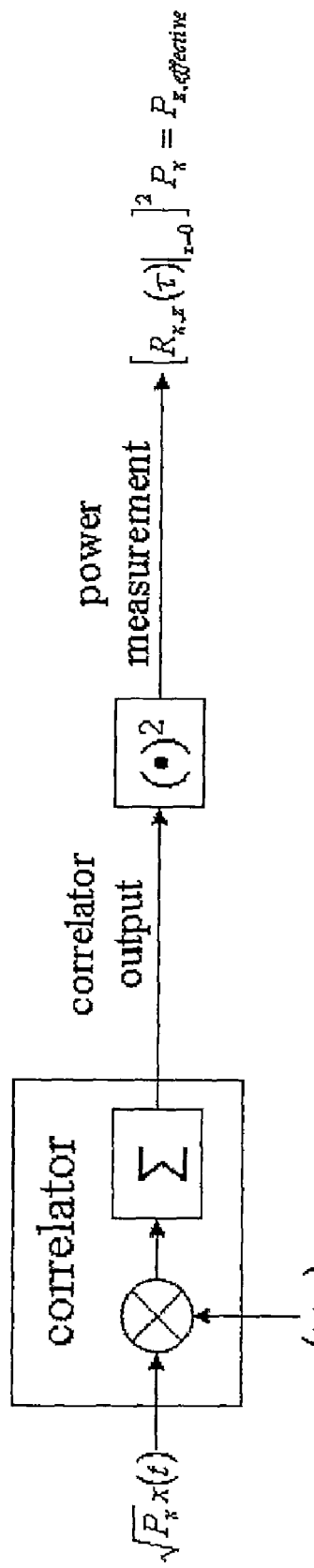
FIG. 12 is a diagram illustrating how the effective power of a component BPSK code is formed.

The matching probability for each component BPSK code determines the correlatable power (also known as effective code power) of the component code received at the output of a correlator of each component code where code z(t)=a(t), b(t) or c(t) and $P_x$ is the power of the composite BPSK code x(t), $P_x=P_a+P_b+P_c=(g_a+g_b+1)*P_c$; as indicated in FIG. 12.

For matching probabilities equal to 75%, the $P_{z,effective}$ is 0.25 of $P_x$ for each component BPSK code. This means a total of 0.75=3(0.25) of the total power of composite BPSK code can be recovered and the combining efficiency is equal to 0.75.

$$\eta_z = \frac{P_{z,effective}}{P_x} = [R_{x,z}(\tau)|_{\tau=0}]^2 \qquad \text{Equation 12}$$

$$0.75 = \eta = \eta_a + \eta_b + \eta_c = 0.25 + 0.25 + 0.25 \qquad \text{Equation 13}$$

This demonstrates via Equation 10 that maintaining the code power ratios $g_a$ and $g_b$ will maintain component BPSK code power efficiencies $\eta_a$, $\eta_b$ and $\eta_c$ as well as the composite code efficiency $\eta$.

Due to the combining efficiency in Equation 13 not being 100%, there is a combining loss. This means the effective code power at the correlator output for each component code will not be PZ, but something less $P_{z,effective} < P_z$. If $P_z$ is desired at the correlator output of each component code (i.e., $P_z$ is expected as the effective code power at the correlator output), then the difference between $P_{z,effective}$ (the effective code power before component code power compensation) and $P_z$ (the effective code power after component code compensation) needs to be made up by some power compensation to the code. The code power compensation can be done for each component code.

For the composite code, the additional power needed for compensation is calculated as follows:

$$P_{compensation} = \frac{1}{\eta} P_x - P_x \qquad \text{Equation 14}$$

This is equivalent to boosting the composite BPSK code power by a gain ($1/\eta$), and the compensated composite BPSK code power may be represented by the equation:

$$\frac{1}{\eta} P_x = P_x + P_{compensation} = P_x + \left(\frac{1}{\eta} P_x - P_x\right). \qquad \text{Equation 15}$$

Note that adding compensation power and maintaining code power ratios do not change the efficiencies shown in Equations 12 and 13. The effective code power for component code a(t) after compensation can be calculated to be:

$$\eta_a \left[ P_x + \left( \frac{1}{\eta} P_x - P_x \right) \right] = \eta_a \frac{P_x}{\eta} = \frac{P_{a,effective}}{\eta} = P_a. \qquad \text{Equation 16} \quad (1)$$

Likewise for the other two component codes:

$$\eta_b \left[ P_x + \left( \frac{1}{\eta} P_x - P_x \right) \right] = \eta_b \frac{P_x}{\eta} = \frac{P_{b,effective}}{\eta} = P_b \qquad \text{Equation 17} \quad (2)$$

$$\eta_c \left[ P_x + \left( \frac{1}{\eta} P_x - P_x \right) \right] = \eta_c \frac{P_x}{\eta} = \frac{P_{c,effective}}{\eta} = P_c. \qquad \text{Equation 18} \quad (3)$$

If the composite code can be made available as the local replica in the correlator (i.e., z(t)=x(t)), the total power of the composite BPSK code x(t) can be recovered. For matching probabilities equal to 50%, no code power can be recovered. This feature can be used to identify that gain weighted combining of three component BPSK Codes is the option being used among a number of different code combining methodologies. Note that the code combining above may also be applied to component BPSK codes of different chip rates.

Second Implementation For Combining Two Component BPSK Codes

Initially the two component BPSK codes are defined by assigning a(t) to represent the first component BPSK code, where a(t) is a random BPSK code equally likely to be +1 or −1, and has the higher code power of the two component BPSK codes. The term b(t) is assigned to represent the second component BPSK code, where b(t) is a random BPSK code equally likely to be +1 or −1, and has a code power no more than that of the first component BPSK code.

A code power ratio (i.e., gain) associated with each of the component BPSK codes a(t) and b(t) is then determined by the following formulas:

$$g_a = \frac{\text{code power of } a(t)}{\text{code power of } b(t)} \qquad \text{Equation 19}$$

$$g_b = \frac{\text{code power of } b(t)}{\text{code power of } b(t)} = 1 \qquad \text{Equation 20}$$

and the code powers are in the descending order (i.e., power of a(t)$\geq$power of b(t), and $g_b$ is set equal to 1 (i.e., $g_a \geq g_b = 1$).

Once the code powers ratios have been determined, and in view of the fact that $g_b$ is set equal to 1, the following algorithm can be used in a chip-synchronous manner to determine the composite BPSK code (where * denotes multiplication):

$$x(t) = \text{sign}\left\{ \left[ \sqrt{g_a}\, a(t) + \sqrt{g_b}\, b(t) - \frac{1}{2} g_a a^2(t) - \frac{1}{2} g_b b^2(t) + \sqrt{g_a}\, a(t) * \sqrt{g_b}\, b(t) \right] \right\} \qquad \text{Equation 21}$$

By Equation 21, the component codes are respectively weighted by their code power ratios then multiplied, summed and thresholded to form the composite BPSK code x(t). Since the composite BPSK code may not fully represent both of the two component codes at any given time, the receiver of each component BPSK code may experience some correlation loss. The implementation of this combining and the amount of possible correlation loss will be discussed further in the following paragraphs.

Since $g_b$=1, and since:

$a^2(t)=b^2(t)=1$, the Equation 21 is simplified to: Equation 22

$$x(t) = \text{sign}\left\{ \left[ \sqrt{g_a}\, a(t) + b(t) - \frac{1}{2} g_a - \frac{1}{2} + \sqrt{g_a}\, a(t) * b(t) \right] \right\}. \qquad \text{Equation 23}$$

Figure 13:
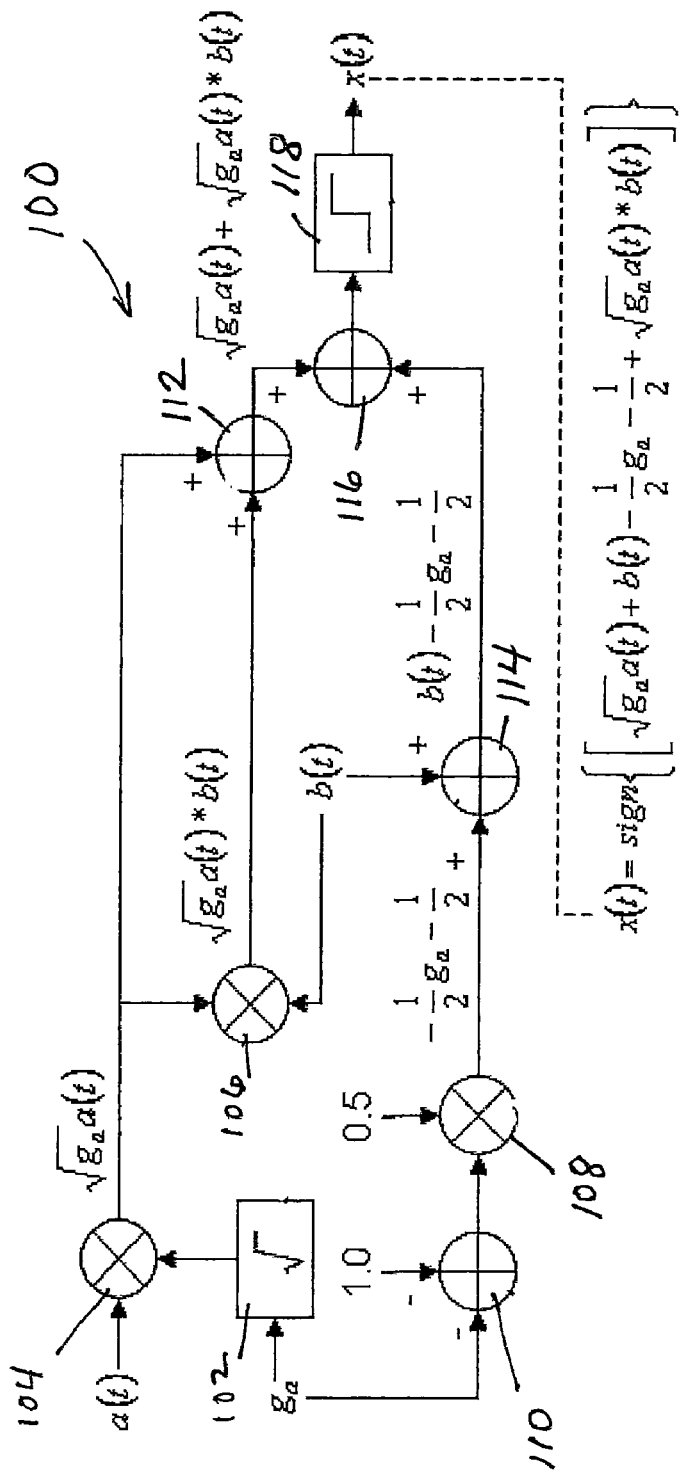
FIG. 13 is a simplified block diagram of a different embodiment of the present disclosure for combining two component BPSK codes into a single, composite BPSK code.

A system 100 in accordance with one embodiment of the present disclosure for implementing Equation 21 is illustrated in FIG. 13. The system 100 makes use of one square root determining circuit 102, three multiplier circuits 104, 106 and 108, four summing circuits 110, 112, 114 and 116, and a zero threshold comparing circuit 118. Alternatively, some or all of the functions may be implemented by a suitably programmed computer processor. For convenience, portions of various equations that are performed by their corresponding components in system 100 are reproduced adjacent to their respective components.

Figure 14:
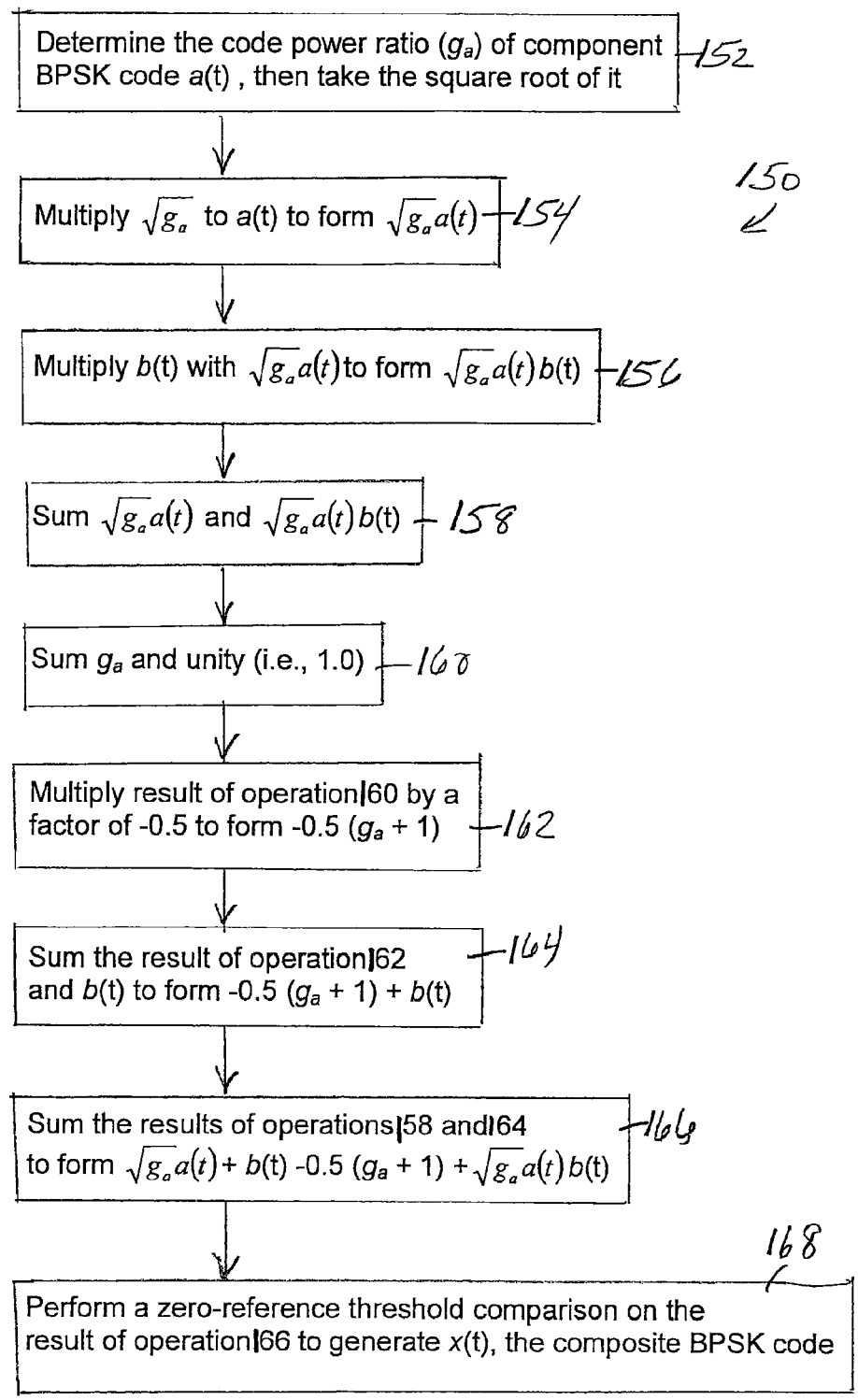
FIG. 14 is a flowchart setting forth a plurality of exemplary operations of a method of operation corresponding to the system in FIG. 13, for combining two potentially different component BPSK codes into a single composite BPSK code.

With reference to the flowchart 150 of FIG. 14 and the system 100 shown in FIG. 13, the operation of the system 100 will be described. At operation 152, first determine the code power ratio ($g_a$) of component BPSK code a(t), then take the square root of it using square root circuit 102. At operation 154, multiply $\sqrt{g_a}$ and a(t) to form $\sqrt{g_a}$a(t) using multiplier circuit 104. At operation 156, multiply b(t) with $\sqrt{g_a}$a(t) to form $\sqrt{g_a}$a(t)b(t) using multiplier circuit 106. At operation 158, sum $\sqrt{g_a}$a(t) and $\sqrt{g_a}$a(t)b(t) using summing circuit 112. At operation 160, negatively sum $g_a$ and unity (i.e., 1.0), using summing circuit 110. At operation 162, multiply result of operation 160 by a factor of 0.5 to form $-0.5\ (g_a+1)$, using multiplier 108. At operation 164, sum the result of operation 162 and b(t) to form $-0.5\ (g_a+1)+b(t)$ using summing circuit 114. At operation 166, sum the results of operations 158 and 164 to form $\sqrt{g_a}a(t)+b(t)-0.5\ (g_a+1)+\sqrt{g_a}a(t)b(t)$ using summing circuit 116. At operation 168 perform a zero-reference threshold comparison on the result of operation 166, using zero threshold comparing circuit 118, to generate x(t), the composite BPSK code.

Referring to the table of FIG. 15, the composite BPSK code x(t) has the matching probabilities shown in the table if $g_a=g_b=1$ (x(t) is the logical AND of a(t) and b(t)). By a "match", it is meant that the product of a component code chip and its corresponding composite code chip is "1"; a mismatch is "−1". Each component BPSK code matches the composite code 75% (i.e., on average each component BPSK code matches the composite BPSK code 3 out of 4 chips). When all 4 chips are matched, the correlation between a component BPSK code and the composite BPSK code would be $$R_{x,a} = R_{x,b} = \frac{4(1)+0(-1)}{4} = 1 = 0 \text{ dB}. \qquad \text{Equation 24}$$

This is a perfect or "full" correlation. When the matching probability drops below 100%, perfect correlation is no longer achievable. For a matching probability of 75%, the impact on the correlation is shown below:

$$R_{x,a} = R_{x,b} = \frac{3(1)+1(-1)}{4} = 0.50 = -3 \text{ dB}. \qquad \text{Equation 25}$$

Hence, a 75% matching probability translates to a 3 dB correlation loss. Note that each matching or mismatching chip increases or decreases the correlation, respectively.

If $g_a$ varies, the matching probabilities will also vary. For code power ratios $g_a=18$ and $g_b=1$, the matching probabilities are shown in the table of FIG. 16. A matching probability of 50% means on average each component BPSK code matches the composite BPSK code two out of four chips. The correlation is reduced to zero:

$$R_{x,a} = R_{x,b} = \frac{2(1)+2(-1)}{4} = 0 = -\infty \text{ dB}. \qquad \text{Equation 26}$$

Since the code power ratio $g_a$ between the component BPSK codes changes the correlation between the composite BPSK code and each component BPSK code, one will need to ascertain the range of $g_a$ and the corresponding matching probabilities for the component codes. This development is shown below from Equation 27:

$$x(t) = \text{sign}\left\{\left[\sqrt{g_a}\,a(t)+b(t)-\frac{1}{2}g_a-\frac{1}{2}+\sqrt{g_a}\,a(t)*b(t)\right]\right\}. \qquad \text{Equation 27}$$

Since the composite BPSK code x(t) changes from 1 to −1 at some gain $g_a$ when a(t)=b(t)=1, it can be shown that:

$$x(t) = \text{sign}\left\{\left[2\sqrt{g_a}-\frac{1}{2}g_a+\frac{1}{2}\right]\right\} = \begin{cases} 1 \\ 0 \\ -1 \end{cases} \qquad \text{Equation 28}$$

depends on the gain ratios and it can be interpreted as $$2\sqrt{g_a}-\frac{1}{2}g_a+\frac{1}{2} \gtrless 0 \qquad \text{Equation 29}$$

$$4\sqrt{g_a}+1 \gtrless g_a \qquad \text{Equation 30}$$

Hence $$\frac{4\sqrt{g_a}+1}{g_a} \gtrless 1 \qquad \text{Equation 31}$$

The implication is that $$x(t) = \text{sign}\left[2\sqrt{g_a}-\frac{1}{2}g_a+\frac{1}{2}\right] = \begin{cases} 1 \text{ and } 75\% \text{ matching} & \text{if } \frac{4\sqrt{g_a}+1}{g_a} > 1 \\ 0 \text{ and } 50\% \text{ matching} & \text{if } \frac{4\sqrt{g_a}+1}{g_a} = 1 \\ -1 \text{ and } 50\% \text{ matching} & \text{if } \frac{4\sqrt{g_a}+1}{g_a} < 1 \end{cases}$$

Figure 17:
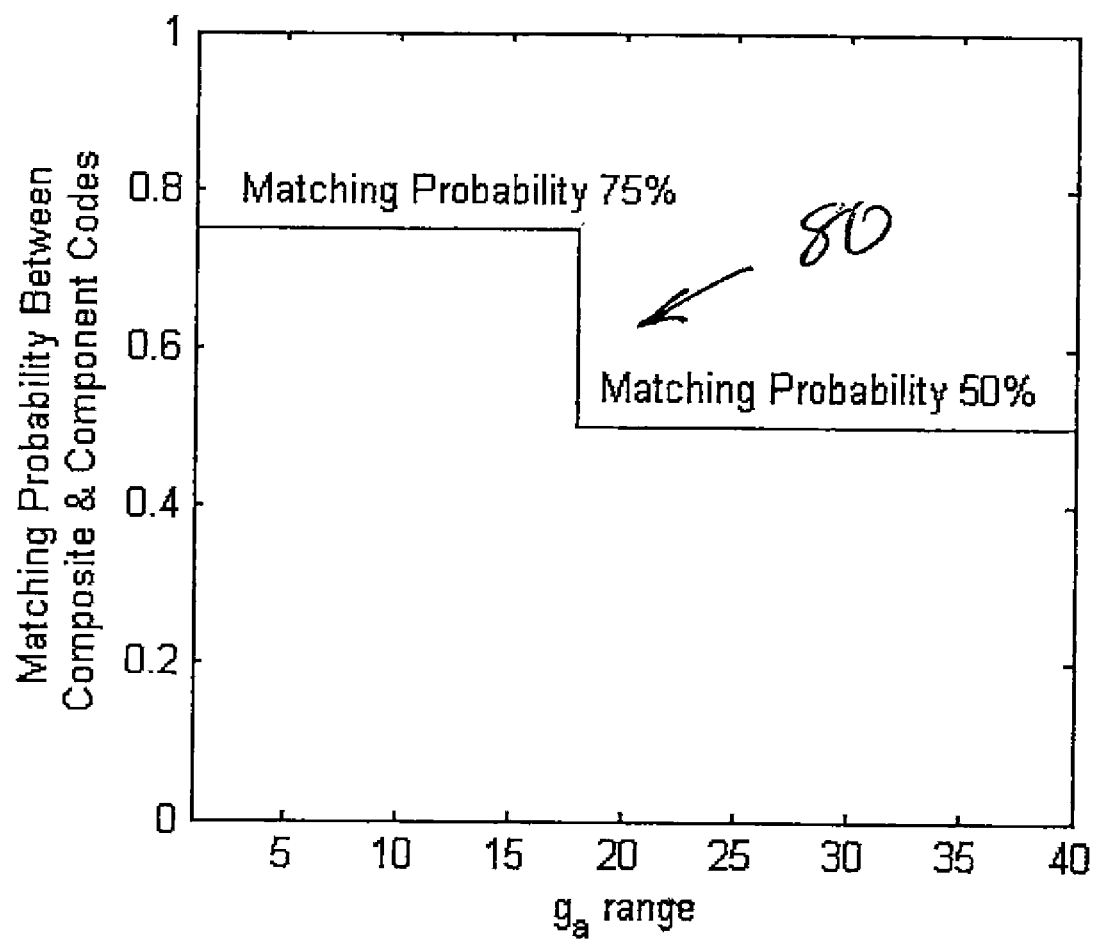
FIG. 17 is a graph illustrating the matching probability of each component BPSK code over the range of $g_a$.

FIG. 17 shows a graph 180 indicating ranges and matching probabilities for the composite BPSK code x(t) and each of the two component BPSK codes. For $g_a<(2+\sqrt{5})^2$ the matching probability is 75%; otherwise the matching probability is 50%. The derivation is shown below:

$$x(t) = \text{sign}\left[2\sqrt{g_a}-\frac{1}{2}g_a+\frac{1}{2}\right] = 0 \text{ if } \frac{4\sqrt{g_a}+1}{g_a}=1 \qquad \text{Equation 32}$$

$$\frac{4\sqrt{g_a}+1}{g_a} = 1$$

$$g_a - 4\sqrt{g_a} - 1 = 0$$

This is a quadratic equation and its solution is:

$$\sqrt{g_a} = \frac{4 \pm \sqrt{16+4}}{2}. \qquad \text{Equation 33}$$

Since $g_a$ can only be positive, then $$\sqrt{g_a} = 2+\sqrt{5}$$

$$g_a = (2+\sqrt{5})^2$$

The occurrence of this equation is on the border between matching probabilities 75% and 50%, and the probability of its occurrence is very small and is negligible. The matching probabilities are shown in the table of FIG. 18. Hence the ranges for $g_a$ and the corresponding matching probabilities can mathematically be expressed as $$x(t) = \text{sign}\left[2\sqrt{g_a} - \frac{1}{2}g_a + \frac{1}{2}\right]$$ Equation 34

$$= \begin{cases} 1 \text{ and } 75\% \text{ matching} & \text{if } \frac{4\sqrt{g_a}+1}{g_a} > 1 \\ -1 \text{ and } 50\% \text{ matching} & \text{if } \frac{4\sqrt{g_a}+1}{g_a} < 1 \end{cases}$$

FIGS. 19A, 19B, 20A, 20B, 21A, 21B, 22A and 22B demonstrate the relationship between the matching probability and the associated correlation at various code power ratios. FIGS. 19-22 assume infinite bandwidth. Had a low-pass filter of a finite bandwidth been applied before correlation takes place, the correlation would be reduced due to out-of-band loss. The amount of reduction depends on the filter bandwidth and the chip rates of the component codes. FIGS. 19A and 19B are graphs illustrating the correlations of the composite BPSK code with itself and with the component BPSK codes. The correlation of the composite BPSK code with itself has a peak of unity since it matches itself perfectly as it should (Equation 24). The correlations of the composite BPSK code with the component BPSK codes have peaks roughly 0.5 indicating the 75% matching between the composite BPSK code and the component BPSK codes (see Equation 25). FIG. 19B is an enlarged version of FIG. 19A focusing on the details of the peaks of these correlations.

The correlations shown in FIGS. 19-21 have gain ratios in the interval of [1 ... (2+√5)²] in FIG. 17, and have a matching probability of roughly 75% as stated in Equation 19. The correlations in FIG. 22B are virtually zero since the code power ratios are well beyond the interval [1 ... (2+√5)²] in FIG. 17. The correlation of composite BPSK code x(t) in FIGS. 19 through 21 do not have zero noise floor since the composite BPSK code is not equally probable between −1 and +1.

Figure 23:
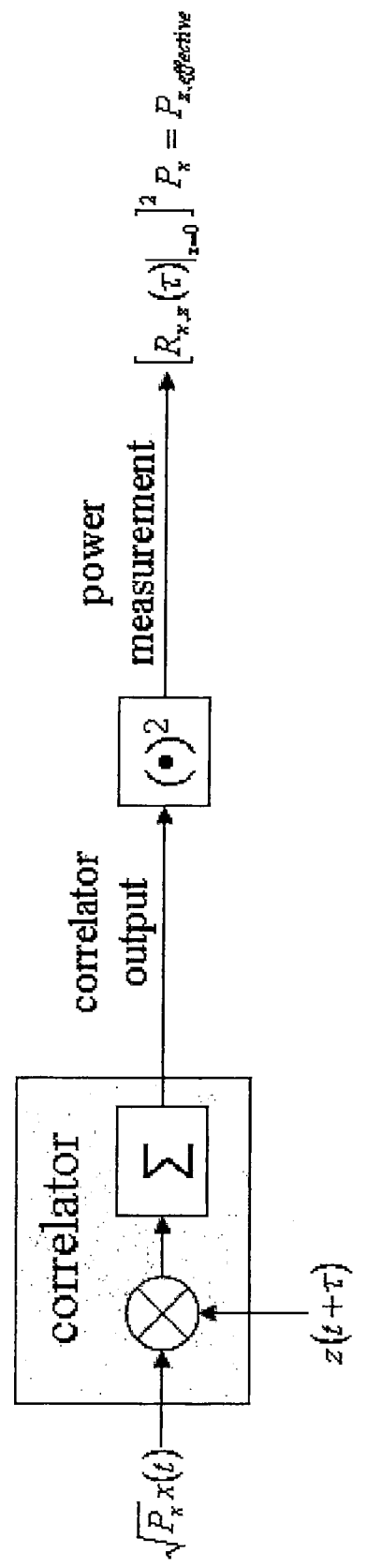
FIG. 23 is a diagram of the variables and operations that determine the effective power of a component BPSK code.

The matching probability for each component BPSK code determines the correlatable power (i.e., "effective code power") of the component code received at the output of the correlator of each component BPSK code where code z(t)=a(t) or b(t), and $P_x$ is the power of the composite BPSK code x(t), $P_x = P_a + P_b = (g_a+1)*P_b$. This is shown in FIG. 23.

For matching probabilities equal to 75%, the $R_{x,a}(\tau=0) = R_{x,b}(\tau=0) = 0.5$ and the $P_{z,effective}$ is 0.25 of $P_x$ for each component BPSK code. This means a total of 0.5=2(0.25) of the total power of the composite BPSK code can be recovered and the power efficiency=0.5.

$$\eta_z = \frac{P_{z,\text{effective}}}{P_x} = [R_{x,z}(\tau)|_{\tau=0}]^2$$ Equation 35

$$0.5 = \eta = \eta_a + \eta_b$$ (4)

This demonstrates via Equation 34 that maintaining the code power ratio $g_a$ in a certain range will maintain each component code power efficiency $\eta_z$ as well as the composite code efficiency $\eta$.

Due to the combining efficiency in Equation 35 not being 100%, there is a combining loss. This means the effective code power at the correlator output for each component BPSK code will not be $P_z$, but something less $P_{z,effective} < P_z$. If $P_z$ is desired at the correlator output of each BPSK component code (i.e., $P_z$ is expected as the effective code power at the correlator output), then the difference between $P_{z,effective}$ (the effective code power before component BPSK code power compensation) and $P_z$ (the effective code power after component BPSK code compensation) needs to be made up by some power compensation to the code. The code power compensation can be done for each component BPSK code.

For the composite BPSK code, the additional power needed for the compensation is calculated as $$P_{compensation} = \frac{1}{\eta}P_x - P_x.$$ Equation 36

It will be noted that adding compensation power and maintaining code power ratios does not change the efficiencies shown in Equation 35. The compensation power defined by Equation 36 is equivalent to boosting the composite code power by a gain (1/η) and the compensated composite code power is:

$$\frac{1}{\eta}P_x = P_x + P_{compensation} = P_x + \left(\frac{1}{\eta}P_x - P_x\right).$$ Equation 37

The effective code power for a(t) after compensation can be calculated to be:

$$\eta_a\left[P_x + \left(\frac{1}{\eta}P_x - P_x\right)\right] = \eta_a \frac{P_x}{\eta} = \frac{P_{a,effective}}{\eta} = P_a.$$ Equation 38

Likewise, for the other component BPSK code, the effective code power after compensation can be calculated to be:

$$\eta_b\left[P_x + \left(\frac{1}{\eta}P_x - P_x\right)\right] = \eta_b \frac{P_x}{\eta} = \frac{P_{b,effective}}{\eta} = P_b.$$ Equation 39

It will be appreciated that a code power and chip rate for each component BPSK code (in both of the two and three code combining implementations) could also be remotely programmed to tailor the system 10 to meet the needs of a specific application.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for combining a plurality of component binary phase shift keying (BPSK) codes to form one composite BPSK code, using a subsystem for performing mathematical multiplying and summing operations, the method comprising:
    determining a code power ratio for each of said component BPSK codes;
    gain weighting each of said BPSK codes by its respective code power ratio to form a corresponding plurality of gain weighted codes;
    processing each of said component BPSK using its respective code power ratio to form a composite BPSK code, where the composite BPSK code has at least a fifty percent probability of matching each one of said component BPSK codes;

wherein said gain weighting to form said plurality of gain weighted codes includes:
assigning a(t) to represent said first component BPSK code having a highest code power of said three component BPSK codes;
assigning b(t) to represent said second component BPSK code having a second highest code power of said three component BPSK codes; and
assigning c(t) to represent said third component BPSK code having a code power; and
determining said code power ratios using corresponding gain weighting formulas:

$$g_a = \frac{\text{code power of } a(t)}{\text{code power of } c(t)}$$

$$g_b = \frac{\text{code power of } b(t)}{\text{code power of } c(t)}$$

$$g_c = \frac{\text{code power of } c(t)}{\text{code power of } c(t)} = 1.$$

2. The method of claim 1, wherein first, second and third component BPSK codes are combined to form said composite BPSK code.

3. The method of claim 2, wherein:
a(t) is a random BPSK code equally likely to be +1 or −1;
b(t) is a random BPSK code equally likely to be +1 or −1; and
c(t) is a random BPSK code equally likely to represent +1 or −1.

4. The method of claim 1, further comprising determining a power efficiency of each said component BPSK code.

5. A method for combining first, second and third component binary phase shift keying (BPSK) codes to form one composite BPSK code, using a subsystem for performing mathematical multiplying and summing operations, the method comprising:
gain weighting each of said first, second and third component BPSK codes by its respective code power ratio to form first, second and third gain weighted codes;
processing the first, second and third component BPSK codes using the code power ratios to form a composite BPSK code, where the composite BPSK code has at least a fifty percent probability of matching each one of said component BPSK codes;
wherein gain weighting of said first, second and third BPSK codes comprises the operations:
assigning a(t) to represent said first component BPSK code, where a(t) is a random BPSK code equally likely to be +1 or −1, and has a highest code power of said three component BPSK codes;
assigning b(t) to represent said second component BPSK code, where b(t) is a random BPSK code equally likely to be +1 or −1, and has a second highest code power of said three component BPSK codes;
assigning c(t) to represent said third component BPSK code, where c(t) is a random BPSK code equally likely to represent +1 or −1, and has a code power;
determining the code power ratios using corresponding gain weighting formulas:
and wherein said composite BPSK code is represented by a term x(t), and wherein x(t) is determined by the formula:

$$x(t)=\text{sign}\{[\sqrt{g_a}a(t)+\sqrt{g_b}b(t)+c(t)-c(t)-\sqrt{g_a}a(t)*\sqrt{g_b}b(t)*c(t)]\}.$$

6. The method of claim 5, where the composite BPSK code has a seventy-five percent probability of matching each one of said component BPSK codes.

7. The method of claim 5, where wherein $g_a$, $g_b$ and $g_c$ are arranged such that:

$$g_a > g_b > g_c = 1.$$

8. The method of claim 5, further comprising determining a power efficiency of each said component BPSK code using a formula:

$$\eta_z = \frac{P_{z,\text{effective}}}{P_x} = [R_{x,z}(\tau)|_{\tau=0}]^2$$

where:
$P_a$ is a power of component code a(t);
$P_b$ is a power of component code b(t);
$P_c$ is a power of component code c(t);
$P_x$ is a power of composite code x(t); and $$P_x = P_a + P_b + P_c = (g_a + g_b + 1)*P_c.$$

9. The method of claim 8, further comprising compensating for a reduction in effective code power of said composite BPSK code.

10. The method of claim 5, wherein each of the plurality of component BPSK codes is represented in the composite BPSK code with a common power efficiency; and
wherein a combining loss resulting from combining the plurality of component BPSK codes is substantially the same for each of the plurality of component BPSK codes.

11. The method of claim 5, wherein a code power and chip rate of each of the plurality of component BPSK codes is remotely programmable.

12. A method for combining first and second component binary phase shift keying (BPSK) codes to form one composite BPSK code, using a subsystem for performing mathematical multiplying and summing operations, the method, comprising:
gain weighting each of said first and second component BPSK codes using a code power of each said component BPSK code as follows:

$$g_a = \frac{\text{code power of } a(t)}{\text{code power of } b(t)}$$

$$g_b = \frac{\text{code power of } b(t)}{\text{code power of } b(t)}$$

where a(t) represents said first component BPSK code, and $g_a$ comprises a gain weighted first component BPSK code, and
where b(t) represents said second component BPSK code, and $g_b$ comprises a gain weighted second component BPSK code,
selecting an order of said BPSK codes such that $g_a > g_b$, and $g_b$ is set equal to 1; and
processing the first and second gain weighted component BPSK codes to form a single, composite BPSK code that is representative of the two component BPSK codes; and
wherein said composite BPSK code is represented by a term x(t), and wherein x(t) is determined by the formula:

$$x(t) = \text{sign}\left\{\left[\sqrt{g_a}\,a(t) + b(t) - \frac{1}{2}g_a - \frac{1}{2} + \sqrt{g_a}\,a(t)*b(t)\right]\right\}.$$

13. The method of claim 12, wherein said composite BPSK code has a greater than fifty percent probability of matching each one of said component BPSK codes over four unique chips formed by said two component BPSK codes.

14. The method of claim 12, wherein the composite BPSK code has approximately a fifty percent to seventy-five percent probability of matching each of said component BPSK codes over said four unique chips formed by said two component BPSK codes.

15. The method of claim 12, further comprising determining a power efficiency of each said component BPSK code for use in compensating for a power loss associated with each said component BPSK code, wherein a formula for determining a power efficiency of each said component BPSK includes:.

$$\eta_z = \frac{P_{z,\text{effective}}}{P_x} = [R_{x,z}(\tau)|_{\tau=0}]^2.$$

where
$P_a$ is a power of first component BPSK code a(t);
$P_b$ is a power of second component BPSK code b(t);
$P_x$ is a power of third composite BPSK code x(t); and $$P_x = P_a + P_b = (g_a + 1)*P_b.$$

16. A system for generating a single, composite binary phase shift keying (BPSK) that is representative of three component BPSK codes, the system comprising:
 a pair of square root determining circuits;
 a first pair of multiplier circuits responsive to said square root determining circuits;
 a second pair of multiplier circuits responsive in part to said first pair of multiplier circuits;
 first and second summing circuits responsive in part to said first pair of multiplier circuits;
 a third summing circuit responsive to outputs of said first and second summing circuits;
 a zero threshold circuit for comparing an output of said third summing circuit against a zero threshold; and
 said square root determining circuits, said multiplier circuits, said summing circuits and said zero threshold circuit being configured to execute an algorithm comprising:

$$x(t) = \text{sign}\{[\sqrt{g_a}\,a(t) + \sqrt{g_b}\,b(t) + c(t) - \sqrt{g_a}\,a(t)*\sqrt{g_b}\,b(t)*c(t)]\}$$

where a(t) represents a first component BPSK code, and $\sqrt{g_a}\,a(t)$ comprises a gain weighted first component BPSK code;
where b(t) represents said second component BPSK code, and $\sqrt{g_b}\,b(t)$ comprises a gain weighted second component BPSK code;
where c(t) represents said third component BPSK code, and $\sqrt{g_c}\,c(t)$ comprises a gain weighted third component BPSK code (since $g_c=1$, the gain weighted third component BPSK code is c(t)); and
where an order of said component BPSK codes has been selected such that $g_a \geq g_b \geq g_c$, and $g_c$ is set equal to 1.

17. A system for generating a single, composite binary phase shift keying (BPSK) code that is representative of each one of a pair of component BPSK codes, the system comprising:
 a square root determining circuit for taking a square root of an input representing a code power ratio $g_a$;
 a first multiplier circuit responsive to an output of said square root determining circuit and to an input a(t);
 a second multiplier circuit and a first summing circuit each responsive in part to an output from said first multiplier circuit, said second multiplier circuit being responsive to an input b(t);
 a second summing circuit for summing said code power ratio $g_a$ and a constant;
 a third multiplier circuit for multiplying an output of said second summing circuit with a constant;
 a third summing circuit for summing an output of said third multiplier circuit and said input b(t);
 a fourth summing circuit for summing an output of said third summing circuit and said first summing circuit;
 a threshold circuit for comparing an output of said fourth summing circuit against a zero threshold; and
 said square root determining circuit, said multiplier circuits, said summing circuits and said zero threshold circuit adapted to execute an algorithm comprising:

$$x(t) = \text{sign}\left\{\left[\sqrt{g_a}\,a(t) + b(t) - \frac{1}{2}g_a - \frac{1}{2} + \sqrt{g_a}\,a(t)*b(t)\right]\right\}$$

where a(t) represents a first component BPSK code, and $\sqrt{g_a}\,a(t)$ comprises a gain weighted first component BPSK code;
where b(t) represents said second component BPSK code, and $\sqrt{g_b}\,b(t)$ comprises a gain weighted second component BPSK code (since $g_b=1$, the gain weighted second component BPSK code is b(t)); and
where an order of said component BPSK codes has been selected such that $g_a \geq g_b$, and $g_b$ is set equal to 1.

* * * * *